June 15, 1965 A. DEL CORRAL 3,189,795
BIDIRECTIONAL BINARY COUNTER SYSTEM
Filed Oct. 29, 1964 3 Sheets-Sheet 1

TABLE 1

| $Y_1Y_2$ \ $X_1X_2$ | 00 | 01 | 11 | 10 |
|---|---|---|---|---|
| 00 | 01 | 10 | 01 | 00 |
| 01 | 01 | 00 | 01 | 10 |
| 11 | 01 | 00 | 01 | 10 |
| 10 | 01 | 10 | 01 | 00 |

BINARY OPERATION

TABLE 2

| $Y_1Y_2$ \ $X_1X_2$ | 00 | 01 | 11 | 10 |
|---|---|---|---|---|
| 00 | 11 | 00 | 11 | 10 |
| 01 | 11 | 10 | 11 | 00 |
| 11 | 11 | 10 | 11 | 00 |
| 10 | 11 | 00 | 11 | 10 |

BINARY OPERATION

TABLE 3

| $Y_1Y_2$ \ $X_1X_2$ | 00 | 01 | 11 | 10 |
|---|---|---|---|---|
| 00 | 11 | 01 | 11 | 10 |
| 01 | 11 | 10 | 11 | 01 |
| 11 | 11 | 01 | 11 | 10 |
| 10 | 11 | 10 | 11 | 01 |

GREY OPERATION

INVENTOR
ALBERTO DEL CORRAL
BY Walter S. Paul
ATTORNEY

June 15, 1965 A. DEL CORRAL 3,189,795

BIDIRECTIONAL BINARY COUNTER SYSTEM

Filed Oct. 29, 1964 3 Sheets-Sheet 2

INVENTOR
ALBERTO DEL CORRAL
BY Walter S. Paul
ATTORNEY

BIDIRECTIONAL BINARY COUNTER SYSTEM

Filed Oct. 29, 1964 3 Sheets-Sheet 3

| | | | | | | | | | | | |
|---|---|---|---|---|---|---|---|---|---|---|---|
| | 0 | 1 | 2 | 3 | 4 | 5 | 6 | 7 | 8 | 9 | 10 |
| $Y_2$ | 0 | 1 | 0 | 1 | 0 | 1 | 0 | 1 | 0 | 1 | 0 |
| $Y_1$ | 0 | 0 | 1 | 1 | 0 | 0 | 1 | 1 | 0 | 0 | 1 |
| $Y_4$ | 0 | 0 | 0 | 0 | 1 | 1 | 1 | 1 | 0 | 0 | 0 |
| $Y_3$ | 0 | 0 | 0 | 0 | 0 | 0 | 0 | 0 | 1 | 1 | 1 |

INVENTOR
ALBERTO DEL CORRAL

BY Walter S. Paul
ATTORNEY

United States Patent Office 3,189,795 Patented June 15, 1965

3,189,795
BIDIRECTIONAL BINARY COUNTER SYSTEM
Alberto del Corral, Apartado Aereo 5240, Bogota, Colombia
Filed Oct. 29, 1964, Ser. No. 407,415
24 Claims. (Cl. 317—140)

Figures 1, 2, 3:
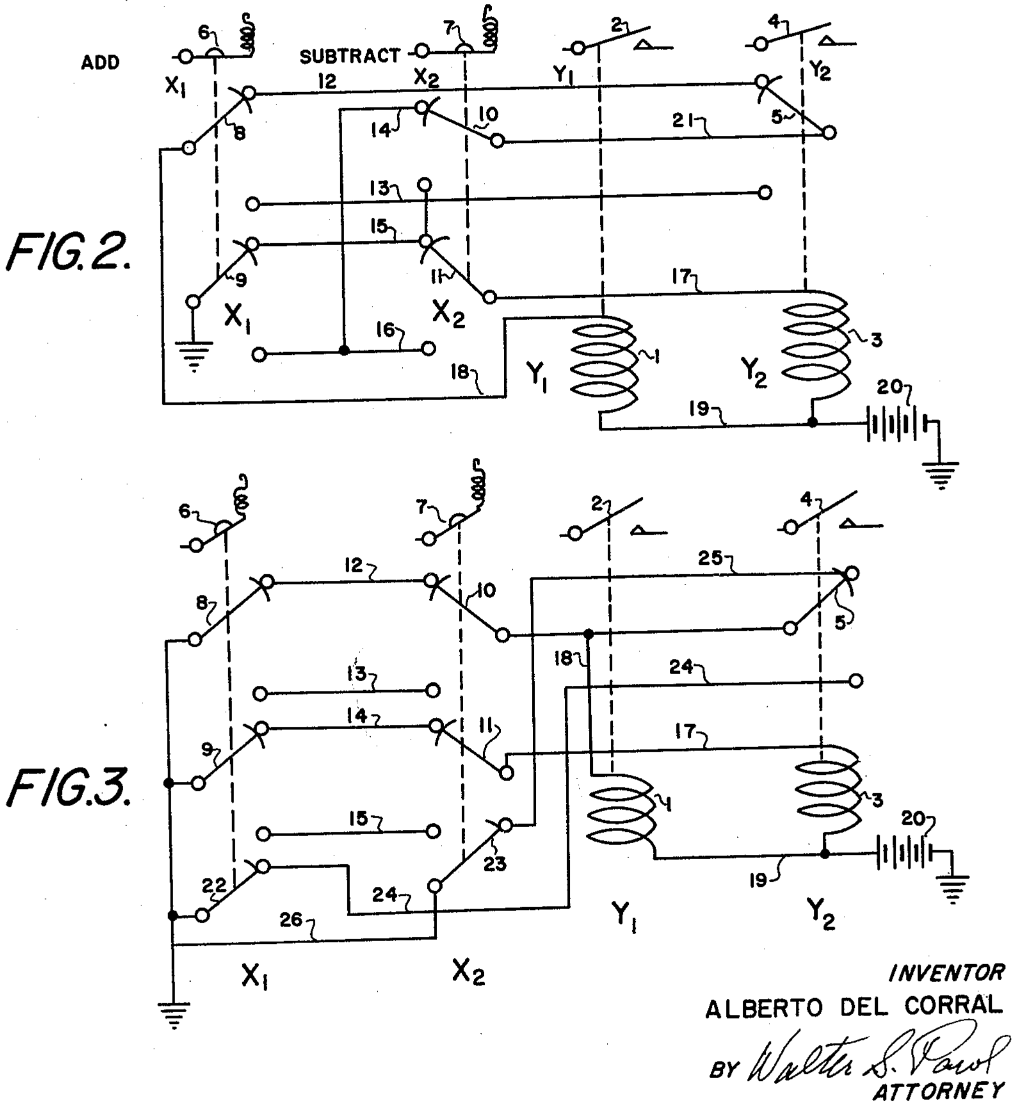

This application is a continuation-in-part of my copending application Serial Number 37,657, filed June 21, 1960.

As in the prior application, the present invention relates to a bidirectional binary counter, wherein the inputs are directly applied to the separate stages. One example of the invention and one which is used to disclose the invention, is an impulse counter using bistable impulse relays or bistable latching systems.

Prior art counters in common use usually comprise several cascade stages which operate in succession to obtain the final result. When the number of binary digits or bits in the register is great, the duration of operation of the counter to obtain the final result is also great.

The present invention seeks to shorten the time period required to obtain the final result of addition or subtraction. To do so, the inputs are applied substantially simultaneously directly to each and every stage and the final result is obtained without the need for the propagation of the operations through the separate stages in succession. As a result, any time delays incurred within the counter system are not cumulative, since the delays at the separate stages of the counter occur simultaneously instead of sequentially as in the prior art devices. Accordingly, the total time requirements to obtain the final results in any addition or subtraction operation is equated to the time delay incurred in the slowest counter element of the system.

Prior art counters employing the cascade connected input stages commonly utilize a pair of counting elements in each stage. A binary counter of this type capable of counting $2^n-1$ inputs or pulses would require $2n$ counting elements. In the present invention having the same number of stages only $n$ number of counting elements would be required. This results in a decided improvement in the economy of use of counting elements that makes for a less expensive piece of apparatus, one that has greater simplicity and one that may be serviced with greater ease.

Prior art devices using $n$ relays in unidirectional counters are known. However, no bi-directional counter is known that uses $n$ number of relays or counting elements per bit. As is to be disclosed herein, the input signal is applied to the separate stages by manual manipulative input devices associated with the individual stages. In this manner even a greater economy of input devices is realized. However, in machines where automatic operation is desired or where the inputs are fed from other associated apparatus additional relays or other input devices may be used in the place of the manual manipulative devices.

In prior art devices for adding and subtracting or counting in two directions, the operation is accomplished by a change in direction of counting through the operation of circuitry including a system of contacts. Those which provide for simultaneous inputs to separate stages to accomplish forward and backward counts are faulty in operation and produce errors in the case add and subtract inputs are inadvertently simultaneously applied. In this invention, the inadvertent application of add and subtract inputs at one and the same time, results in no change in the register of the counter as the one input nullifies the other. Also, should for example an add input be applied when it should have been a subtract input, the operation can be nullified by the application of the subtract input either during or subsequent to the add input. The chance of errors in the final result is very much reduced as a result of the foregoing mode of operation.

Counters of the prior art, especially electronic counters, have another drawback in that pulses have to be defined within narrow limits as distinguished from steady signals by prescribing a maximum and a minimum time during which the pulses may occur. In the present invention the pulses need no such prescription and they may even have different lengths provided only that the pulses have the minimum length to cause the actuation of the relay or other device.

In the present invention the application and release of the manual manipulative devices for the application of an input is considered to be an input pulse and the time intervening between the actuation and the release of the manual manipulative devices determines the duration of the input pulse. The correctness of the operation of the counter is not dependent on the duration of the input pulse. The input is not actually accepted by the apparatus until there is a release of the manually manipulative device or until the end of the input pulse.

Present day binary counters are generally designed for one particular code or have one sequence of operation, as for example, the binary code or the Gray code. The present invention is designed to operate on any particular code or counting system and for the binary sequence, there are two possible separate modes of operation. One mode of operation comprises obtaining one phase of the counting operation when an input pulse is applied and another final phase when the input pulse is released. The second mode of operation comprises obtaining a total count operation upon the release of the input pulse. When the present counter is to be operated on the Gray code, which is a progressive binary sequence, the count is performed only upon the release of the input pulse.

The present invention may use relays having single windings as distinguished from prior art systems which have to use double windings for accomplishing the same results. It may use standard relays which can be procured on the open market and no special structure is required.

The operations obtained by use of the present invention may be effected by any suitable means, electrical, mechanical or any combination thereof, and the invention is not restricted to use of any particular electrical, mechanical or combination of means.

It is therefore the principal object of this invention to provide a novel and improved bidirectional binary counter.

A further object is to provide a binary counter which reduces the time delay inherent in present day counters.

Still further, it is an object to provide a binary counter which will produce a greater degree of accuracy than is obtainable with the present day counters.

It is another object of the invention to provide a counter utilizing single winding and conventional relays readily procurable on the open market.

Figures 4, 5:
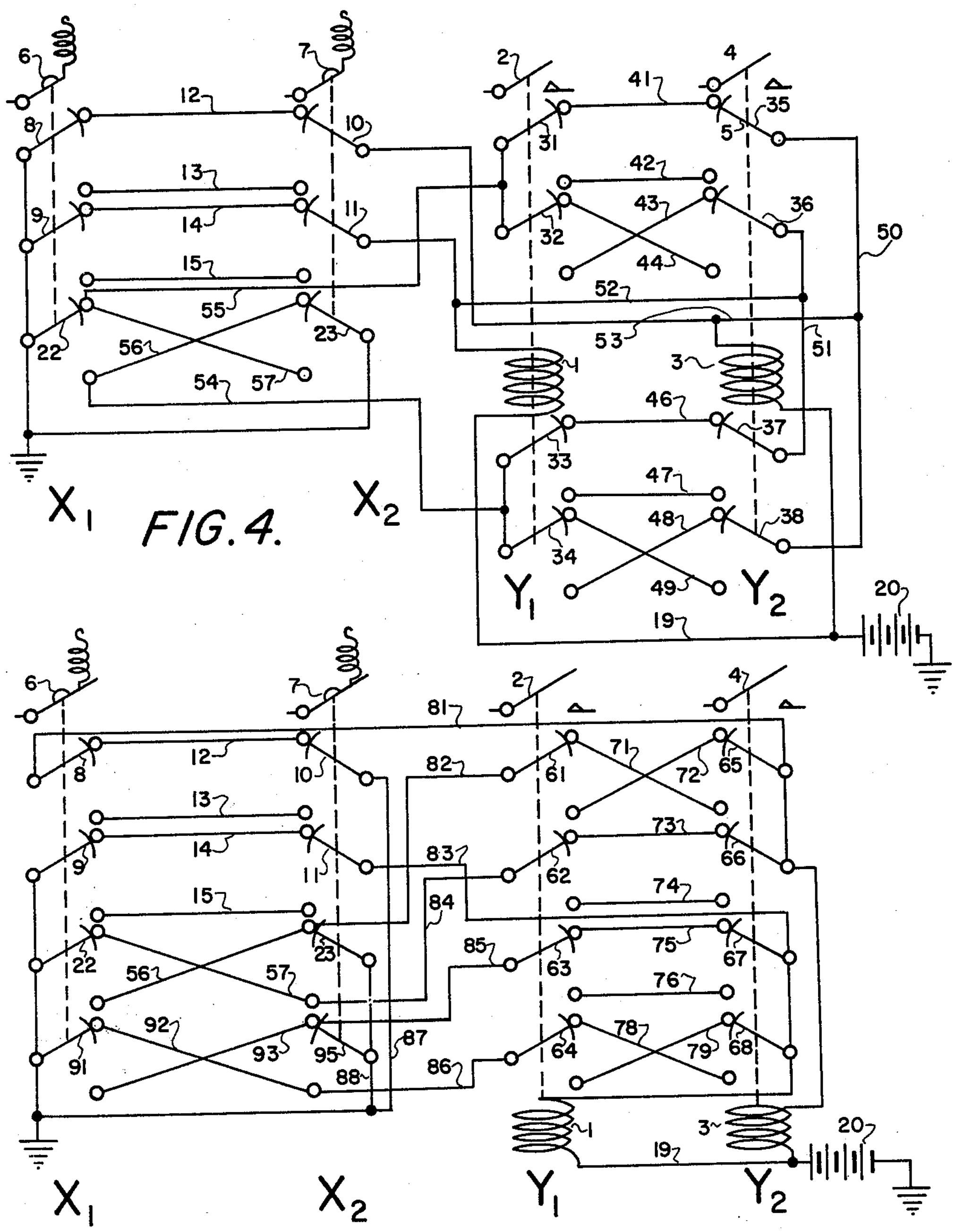
Figures 6, 7:
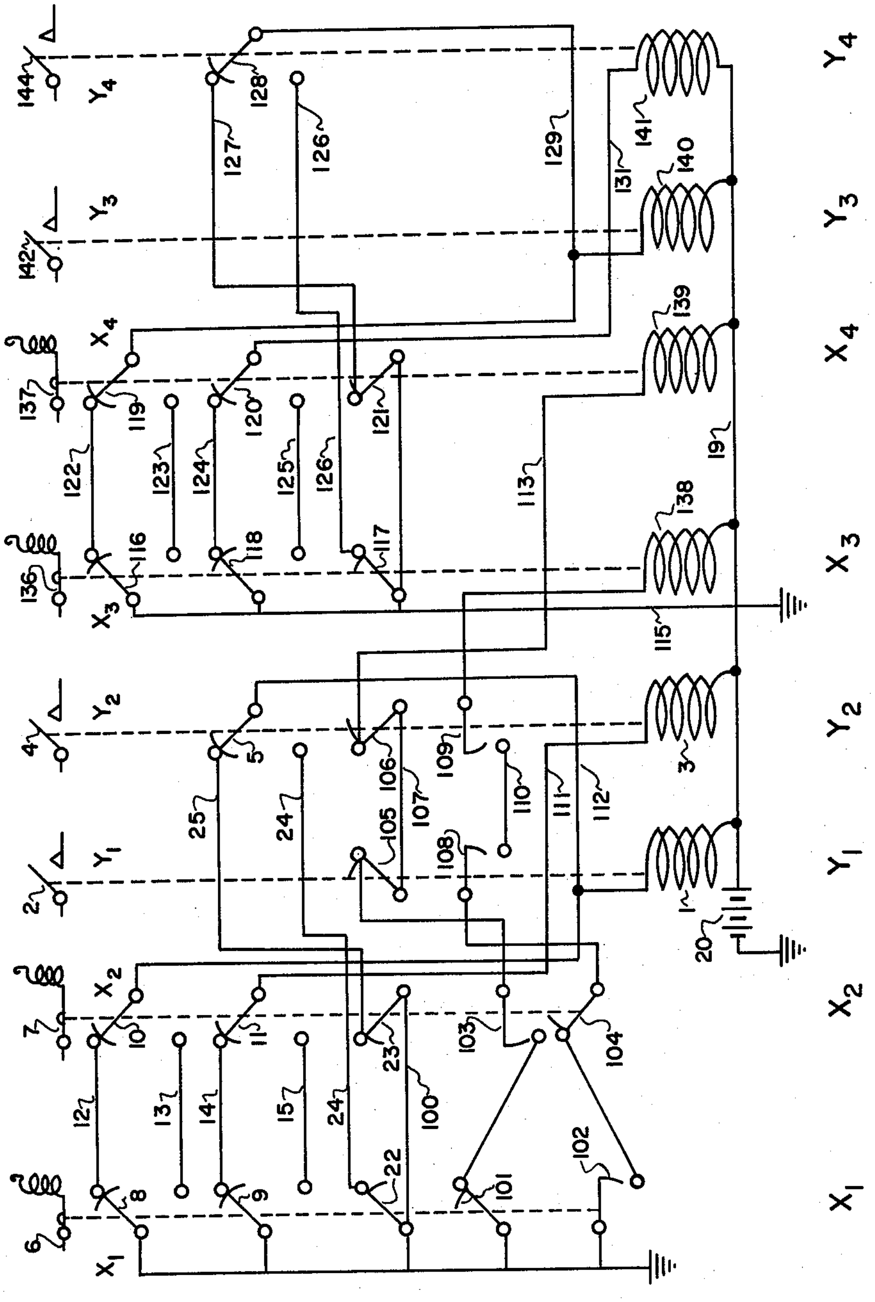

Other objects and advantages of this invention will be apparent upon reference to the accompanying description when taken in conjunction with the following drawings, wherein:

FIG. 1 comprises several energization tables for the relays of the binary counter with each of the tables representing a particular mode of operation, FIG. 2 is a circuit diagram of a binary counter for operation in accordance with the mode of operation depicted in table 1, FIG. 3 is a circuit diagram of a binary counter for operation in accordance with the mode of operation depicted in table 2, FIG. 4 is a circuit diagram of a binary counter for operation in accordance with the mode of operation depicted in table 3, FIG. 5 is a circuit diagram showing a further modification of the invention, FIG. 6 is a circuit diagram of a modification of a binary counter of the invention wherein more than a pair of bistable devices or stages are disclosed, and FIG. 7 is an energization table for the relay counters used in the circuit of FIG. 6.

To simplify the illustration and disclosure of the invention and to facilitate the explanation of the invention, the several relays have been shown diagrammatically and conventional illustrations have been used so as to simplify the understanding of the principles and mode of operation rather than to illustrate the specific construction and arrangements of the components that would be used in construction and practice of the invention.

The basic element of the present invention in one of its forms is a bistable system of contacts of the type which change the state or condition from one to another when energized but which bring about no change in state in the contacts when the relay is de-energized. The most common of these elements is the "so-called" impulse or ratchet such as the Potter and Brumfield AP–17, the COMAR type W and Aemco Inc., type 48. Other relays of the same general type may be employed in the binary counter of the present invention, as for example, bistable devices which change from one state or condition to another when de-energized.

In the drawings, the bistable relays or devices are indicated by the letter Y with subscripts to indicate the particular relay referred to. The movable counter contacts forming a register are indicated by the small letter $y$.

The description is based on the use of make-before-break contactors, and these contactors are arbitrarily shown having arcuate lines on the end of the movable elements to indicate that they are make-before-break contactors. Break-before-make contactors are more commonly found in the prior art counters and can also be used in the present counter. The only difference is that additional contact arrangements must be employed to avoid errors of operation when a momentary interruption of the input signal is encountered during a change of position or condition of the movable contacts. Since the time required for full release of the inpulse relays as employed in the present invention is relatively large, break-before-make contactors can be used in the present binary counter and the chance for errors occurring will be quite remote.

The set of contacts for each input is designated $x_1$ and $x_2$ etc., respectively, for the add and subtract input signals. When a signal is applied, the state or condition of these contacts will change to their opposite versions or conditions but will return to the original condition or version upon release of the signal or pulse. All $x_1$ contacts operate simultaneously in the same manner as also do all $x_2$ contacts. The large case letters $X_1$ and $X_2$ represent the manually manipulative devices for applying an input and for actuating the contacts $x_1$ and $x_2$ respectively. The large case letters $Y_2$ and $Y_1$ respectively represent the solenoids respectively for the least and next more significant digits or bits of the counter register and they actuate the contactors $y_2$ and $y_1$ respectively, which may control circuits to lights or other types of indicating means for the register.

It is to be understood that the $y$ contactors do not have a "so-called" normally open or normally closed position, since these contactors are the bistable elements of the relays which actuate them and which will remain in either open or closed position to which they are moved by the last received pulse until a new pulse is received.

The energized condition of the Y relays and for the signal input means X is represented by the numeral 1 and the de-energized condition is represented by the numeral 0 and this system is used in the tables 1–3 inclusive. Condition 1 of $X_1$ and $X_2$ requires a condition 1 of its corresponding contactors $x$ while condition 1 for $Y_1$ and $Y_2$ may correspond to either condition 0 or 1 of its contactors $y$.

A binary code is a counting code based upon the existence of only two conditions as for example represented by 0 and 1. There are many possible binary codes according to which order the digits are changed. One example is the Natural Binary code, which for convenience of reference is partially set forth below:

| 8421 | Decimal value |
|---|---|
| 0000 | =0 |
| 0001 | =1 |
| 0010 | =2 |
| 0011 | =3 |
| 0100 | =4 |
| 0101 | =5 |
| 0110 | =6 |
| 0111 | =7 |
| 1000 | =8 |
| 1001 | =9 |
| 1010 | =10 |

It will be noted that in the (1) column of the natural binary code, as the count proceeds from one decimal value to the next, that there is a change in the stable condition of the registering element of the counter with every input pulse. In the least significant digit or bit column (1) as one progresses from zero to ten the digit or bit changes alternately from 0 to 1 and back to 0. Consequently, the stable condition of the $y_2$ contact which is in the 0 position when the register represents zero is transferred from that position to the 1 position and back on the second input pulse and thus operates between the 0 and 1 position on each and every input pulse.

It will also be noted that the next significant digit or bit or in column (2) the changes from one condition to the other occur on every second input pulse. In the third column under (4) the change occurs on every fourth input pulse and in the fourth column under (8) the changes occur on every eighth input pulse. It will be necessary to keep this in mind when considering the mode of operation of the counters as it is designed to produce the necessary operations to provide the necessary changes in the counter register so that it progresses from one condition to the next in accordance with the code used.

Proceeding now to Table 1 in FIG. 1, it represents the energization of the relay coils $Y_1$ and $Y_2$ corresponding to the conditions or positions of the input signal contactors. The numeral in each square on the left represents the energization condition of the $Y_1$ relay coil or its equivalent and the numeral on the right in each square represents the energization condition of the $Y_2$ relay coil or its equivalent. The marginal indicia for $x_1x_2$ and $y_1y_2$ respectively represents the corresponding operative condition of the contactors, the contact positions of the input signals being indicated by the coordinates of the vertical columns and the contact positions of the contactors of the impulse or counter relays being represented by the coordinates of the horizontal lines.

Referring now to FIG. 2 there is a circuit designed for operation according to the mode of operation designated in table 1 of FIG. 1. This circuit comprises binary bi-stable relays $Y_1$ and $Y_2$. Relay $Y_1$ comprises a coil 1 and a contactor 2. Contactor 2 is as heretofore stated operated from one position to the other position between the open position and the closed position and the reverse only upon the energization of the coil 1. The relay $Y_2$ similarly has a coil 3 and contactor 4 which is operated from one position to the other position between the open and closed positions and the reverse only upon the energization of the coil 3. The coils 1 and 3 have one terminal thereof connected permanently to a source of potential as represented by the battery 20, the other terminal of the battery being connected to ground. The other terminals of the coils are conneced selectively to ground to complete the circuit through contactors associated with the input means whereby to actuate the contactors 2 and 4 in accordance with the requirements dictated by the code that is to be used. The means for selectively connecting the coils 1 and 3 to ground consists of a system of contacts and connecting circuits operable in this example by manually manipulative means such as the ADD push button 6 and the SUBTRACT push button 7. These push buttons have a stable upper position in which they repose when not being operated and to which they return, the return being effected as by biasing means such as springs connected to the ends of the levers on which the push buttons are mounted. Each push button is connected to a pair of contactors, each contactor of which moves between two spaced stationary contacts in a manner that it makes contact with the contact in the direction of movement before it breaks contact with the contact it leaves. Similarly, the relay $Y_2$ has associated therewith and actuated thereby between two spaced stationary contacts a contactor 5 that also makes contact with the stationary contact toward which it moves before it breaks contact with the stationary contact it leaves. Contactors 8 and 9 are connected mechanically for operation by the push-button 6 and contactors 10 and 11 are connected mechanically for operation by the push-button 7. The contactor 5 is connected mechanically for operation by relay $Y_2$ in the same manner and at the same time as the contactor 4 is actuated thereby, that is, when the coil 3 is first energized.

The ungrounded terminal of the coil 1 is connected by conductor 18 to the contactor 8 and the contactor 9 is connected to ground. The upper and lower stationary contacts of the contactor 8 are connected respectively to the upper and lower stationary contacts of the contactor 5. The contactor 5 is connected by conductor 21 to the contactor 10 and the contactor 11 is connected to the ungrounded terminal of the coil 3 by the conductor 17. Conductors 15 and 16 respectively connect the upper and lower stationary contacts of the contactor 9 and the upper and lower stationary contacts of the contactor 11. The upper and lower stationary contacts of the contactor are connected respectively to the conductor 15 and to the conductor 16.

Initially, that is, before any signal or input is applied to the counter, it will be seen that coil 3 will be energized by a circuit from the source of voltage 20, conductor 17, contactor 11, conductor 15, contactor 9, to ground and through ground to complete the circuit. Also it will be seen that coil 1 is initially de-energized by reason of the open circuit including the conductor 18, contactor 8, conductor 21, contactor 5, conductor 21, contactor 10, conductor 14, and the conductor 16. It will also be seen that with the SUBTRACT push-button in unactuated position or with no input thereon, each and every time the push-button 6 is pressed down to apply an ADD input, the circuit to coil 3 will be broken during the application of the input signal to de-energize the coil 3, and upon release of the push-button 6, the coil 3 will be re-energized. As a consequence, the contactor 4 and the contactor 5 will be actuated from the position they occupy before the input pulse to the opposite position upon the release of the input pulse. It will also be noted that so long as the contactor 5 is in the upper position the contactor 8 merely connects the coil 1 to another open circuit via conductor 13, and the coil 1 remains de-energized. However, when the contactor 5 is in the lower position, as it will be on alternate operations of the push-button 6, the circuit will be completed to the coil 1 through the contactor 8, conductor 13, contactors 5, 10, conductor 14, conductor 16, contactor 9 to ground and through ground to the opposite terminal of the source of voltage 20. This application causes the contactor 2 to be actuated to its opposite position from that which it occupied before the coil 1 was energized, and thus to be actuated on every second pulse input to the ADD push-button 6.

Correspondingly, with the ADD push-button 6 in the unactuated position each and every actuation of the SUBTRACT button 7 will similarly break and make the circuit to the coil 3 through the conductor 17, contactor 11, conductor 15, contactor 9, and ground or the conductor 16. During the initial application, the contactor 11 makes contact with the lower stationary contact which is unconnected to ground and the circuit to the coil 3 is broken. Upon release of the push-button or input pulse, the contactor 11 re-establishes the circuit to the coil 3 when the contactor makes contact with its upper stationary contact.

With respect to the contactor 10, it will be noted here that when it is moved into its lower position it makes contact with the lower stationary contact to complete the circuit to coil 1 through the conductor 18, contactor 8, conductor 12, contactors 5, 10, lower contact of contactor 10, conductor 15 and a contactor 9 to ground. Upon release of the input pulse, the circuit to the coil 1 is again broken. When the contactor 5 is in its lower position the coil 1 remains un-energized during input to the SUBTRACT push-button 7.

The contactor 5 thus determines the order in which the coil 1 is energized by the push-buttons 6 and 7. In the case of the ADD push-button or input, coil 1 will be energized on the even number of inputs applied thereto whereas, with respect to the SUBTRACT push-buttons, the coil 1 will be energized on the odd-numbered applied inputs.

To describe the mode of operation of the circuit using the tables, the energized or closed condition is indicated by 1 and the open condition or de-energized condition by 0. Similarly, the condition of the counter contactors $y$ is indicated by 1 if closed and by 0 if opened.

As shown in FIG. 2 the counter there represented would count up to three before reaching the end of the capacity of the register or before it would run out. It is contemplated that more than two stages will be used in the actual counter, but no more than two stages is necessary to disclose the nature of the invention.

As shown in FIG. 2 the $y_1$ and $y_2$ contactors 2 and 4 are open-circuited, which represents 00 indication of the least significant and next significant digits of the binary code on the counter register. With no input pulse as represented by the upper position of the push-buttons, table 1 in the square in the upper left hand corner indicates by the numeral 0 that the coil 1 of the relay $Y_1$ is de-energized whereas the coil 3 of the relay $Y_2$ will be energized as indicated by the numeral 1, appearing on the right side in the square. During this condition the coil 3 is energized through the circuit including contactors 9 and 11.

If the ADD push-button 6 is pressed to impose an ADD input on the circuit as represented in the fourth column from left in table 1, the energization of the coil 3 will be broken during the application of the input pulse as seen in the top square of the fourth column or while the push-button is pressed down. No change will occur in the contactors 4 and 5 when the coil 3 is de-energized because of the nature of the relay being used, as previously described. Upon release of the push-button or input pulse, the circuit to the coil 3 will be re-established and the coil will be re-energized through the previous path and as a result of the re-energization of the coil 3 the contactor 4 or $y_2$ will be moved to the position opposite that which it previously occupied before the input signal, and this position will cause the register to now read 01. $y_2$ being closed and representing the least significant digit will represent 1 whereas at the same time $y_1$ contactor still being open and representing the next more significant digit will represent 0, and the register will read 01 which has a decimal value of 1.

During the initial input just described, the contactor 5 is in the position to make contact with the upper stationary contact. At the completion of the initial operation it moves into contact with its lower stationary contact, which operates to condition the circuit to the coil 1 for its actuation during the next input pulse.

During the second input pulse applied through the ADD input means $X_1$, the coil 3 of the bistable device $Y_2$ will again be de-energized as before during the application of the input pulse, but in addition, coil 1 of the bi-stable device $Y_1$ will become energized as indicated in the second square from the top in the fourth column of table 1 through the path including conductor 18, contactor 8, conductor 13, contactor 5, conductor 21, contactor 10, conductor 14, conductor 16 and contactor 9. This will cause the contactor 2 to change to its opposite position or to the position representing 1. The counter now is in an intermediate state and the register reads 11 for the duration of the input pulse. Upon release of the input pulse or release of the push-button, the coil 3 of the relay $Y_2$ will again be energized through the path including contactor 11, conductor 15 and contactor 9 which will cause the contactors 4 and 5 to move to the opposite position from that which they previously occupied before the release. At the same time the circuit to the coil 1 of the bistable device $Y_1$ is again broken to de-energize that coil. Upon completion of the pulse, that is the application and release, the counter register as represented by the contactors 2 and 4 will be changed from the position indicating 11 to the position indicating 10 which represent a decimal value of 2.

The third and fourth input pulses will operate in exactly the same manner as the first and second ADD input pulses. The third ADD input pulse will de-energize the coil 3 when applied and re-energize the coil when the pulse is terminated. Accordingly, the contactor 4 will change from 0 to 1 position upon the termination of the input pulse. The fourth ADD input pulse will change the counter contactor 2 from the 1 to the 0 position upon the application of the input pulse and the movable contactor 4 from the 1 to the 0 position upon the termination of the input pulse. Accordingly, the counter will be back in its original position, wherein the register as represented by the contactor $y_1$ and $y_2$ will register 00 after temporarily passing through a position 01 occurring during the existence of the input pulse. In the actual counter structure, at this stage of the operation, a carry pulse would be transmitted to the next two stages of the counter to cause the appearance of the 1 in the third significant digit or bit of the register. One means for feeding the carry pulse to the subsequent stages will be disclosed in a subsequent embodiment herein.

The application of a subtract input pulse when the counter register reads 00 will bring about an energization of the coil 1 of the relay $Y_1$. This energization will occur through the path including conductor 18, contactor 8, conductor 12, contactor 5, conductor 21, contactor 10, conductor 15, and contactor 9 to ground. The counter register will pass through an intermediate stage 10 during the existence of the input pulse and with the completion of the input pulse the counter will register 11. At this time the coil 3 will become deenergized through the path including conductor 17, contactor 11. Thus, it is apparent that upon completion of the input pulse coil 3 will become re-energized. The subtract pulse will thus cause a subtraction in the binary notation by shifting the counter from the registration of 00 to a registration of 11 upon completion of the input pulse.

An application of a second input pulse by way of the SUBTRACT input means will move the counter from a registration of 11 to a registration of 10 when the input pulse is terminated by de-energization and re-energization of the coil 3.

Reference to table 1, FIG. 1, will show that the simultaneous application of both ADD and SUBTRACT pulses will produce the same effect as if no pulse at all is applied as can be seen by comparing columns 1 and 3 of table 1. If the release of these pulses occur in the same order as their application, the ADD and SUBTRACT pulses will cancel out between each other. It is further pointed out that if one pulse ADD or SUBTRACT is continuously applied the alternate one will change its effective direction of count. As a result the binary counter of this invention can be used as a unidirectional counter that can be reversed at will through the use of a steady ADD or SUBTRACT input pulse.

Like the mode of operation as illustrated in table 1, the modes of operation represented by tables 2 and 3 can be satisfactorily carried out by numerous and different circuits wherein the components of the circuits can be interconnected in a number of different ways. The connections of the components depend on a number of factors including whether or not the likelihood of errors being introduced in the result derived from the operation are important, if the number of contacts are to be minimized, whether it is important to provide for inadvertent simultaneous application of ADD and SUBTRACT input signals and whether the greater number of contacts are to be located on the relay devices or on the signal input devices. The circuit shown in FIG. 3 is only one example of several possible arrangements for the operation according to the mode of operation according to table 2.

The counter as shown in FIG. 3 includes an extra contact switch means or contactor operable by the input devices for controlling the input to the $Y_1$ bistable device. The input means, as in FIG. 2, includes contactors 8 and 9 and an extra contactor 22. The SUBTRACT input means 7 includes as in FIG. 2, the contactors 10 and 11 and an extra contactor 23. The movable elements of the contactors 8, 9, 22 and 23 are each connected to ground. The contactors 10 and 5 are connected to one terminal of the coil 1 by conductor 18, the other terminal of which is connected to the source of voltage by conductor 19. Contactor 11 is connected by way of conductor 17 to a terminal of the coil 3 of the bistable device $Y_2$. The stationary contacts of contactors 22 and 23 are respectively connected via conductors 24 and 25 to the lower and upper stationary contacts of the contactor 5. Contactor 5 is actuated along with the contactor 4 of the bi-stable device $Y_2$. Relay device $Y_1$ actuates the contactor 2 and each of the relay devices operate in the same manner as similarly identified relay devices of FIG. 2 operate, that is, when the coils are energized or at the beginning of the input pulse to the coils.

The upper stationary contacts of the contactors 8 and 10 are connected by conductor 12, the lower contacts by the conductor 13. The upper stationary contacts of the contactors 9 and 11 are connected by the conductor 14 and the lower stationary contacts by the conductor 15. Also, as in the embodiment of FIG. 2 the contactors of the apparatus are of the make-before-break type.

With the contactors 2 and 4 initially open to indicate 00 on the register and no input pulses applied to either the ADD or the SUBTRACT input devices both coils 3 and 1 are energized. The circuit to coil 1 is completed through conductor 18, contactor 10, conductor 12, contactor 8 to ground and also via contactor 5, conductor 25, contactor 23 and conductor 26 to ground. The circuit of coil 3 is completed via conductor 17, contactor 11, conductor 14 and contactor 9 to ground.

As represented by table 2 for no input being applied and 00 indication on the register both coils are energized as indicated by 11.

The counter of FIG. 3 operates upon release of the input signals and the bi-stable devices $Y_1$ and $Y_2$ operate their contactors at the beginning of the input pulses to their coils. There is no change in the register of the counter as represented by the contactors $y_1y_2$ while input pulses are applied to the input means since the input pulses to the bi-stable devices are delayed until the release of the input means.

Upon application of an ADD input signal, the hold circuit for coil 3 includes contactors 9 and 11, which is broken and the coil 3 is de-energized and this as yet produces no change of the position of the contactor 4 or 5, it being remembered that the contactors are actuated upon re-energization of the coils. During the application of the ADD input for the first count, the circuit through the coil 1 remains unbroken because of the hold circuit through the contactors 23 and 5 which remain in their upper positions. Upon release of the ADD input means 6 or at the cessation of the input pulse, the coil 3 is again re-energized and the contactors 4 and 5 are then actuated to their lower position. The contactor 4 being closed represents a 1 and the contactor 2 being open represents 0 and the register now reads 01. Throughout this operation coil 1 remains energized through either path represented by contactors 5 and 23 or by contactors 8 and 10.

The application of the second input pulse to the ADD input means 6 will now execute a different operation in the counting means. As will be seen, at the conclusion of the previous operation, the contactor 5 is positioned in engagement with its lower stationary contact. This prepares the circuit to the coil 1 to be broken during the application of the second input count signal since the holding circuit through the contactors 23 and 5 during the first operation is now broken. Upon application of the second input count or pulse to the ADD input means 6 and the release thereof the circuits to both coils 1 and 3 will be broken and again completed to respectively de-energize and re-energize the coils to cause each of them to move their contactors to the opposite positions from the positions they previously occupied before the application of the second count or pulse. At the conclusion of the second count input or pulse the contactors 2 and 4 are each moved, the contactor 4 being moved to its open position from its previously closed position and the contactor 2 being moved from its previously open position to its closed position, to thus produce a register reading of 10 representing the decimal value of 2.

As will be seen, the contactor 5 is again returned to its upper position to re-establish the holding circuit for the coil 1 of the bistable device $Y_1$ so that during the application of the third input pulse to the ADD input means 6 the same kind of operation as was obtained with the first input pulse will be obtained, that is, only the coil 3 will be de-energized and re-energized to produce a change of position of the contactors 4 and 5 and a reading on the register of 11 equal to the decimal value of 3.

In the two digit register as represented by the embodiment of FIG. 3 the application of the fourth input count will cause the register to run out, that is both digits represented by the contactors 2 and 4 are returned to their open positions and the register shows 00 thereon. At this point, in a counter having a greater number of digits, a count would be transferred to the third place digit wherein a 1 would represent a decimal value of 4.

The apparatus just described, as in the one shown in FIG. 2, is constructed with a built in structure that reduces the amount of error that might creep into the final count result, through inadvertent operation of the input means. Supposing that the operator of the device should inadvertently press both the ADD and the SUBTRACT push-button input means 6 and 7 simultaneously, in the present arrangement, the operation of both push-buttons at the same time and the release at the same time will effect no operation of the bistable devices or the counting means, because as will be seen the circuits to the coils 1 and 3 will not be broken when both input means are simultaneously actuated, or when the input pulses are simultaneously applied and of the same duration. However, should one input means be released before the other input means, the apparatus will operate in the manner dictated by the last of the input means to be released. If the ADD input means is last to be released then the counting apparatus will register an additional count on its register, whereas if the SUBTRACT input means is the last to be released, the register would register one less count thereon.

The apparatus operates in the opposite direction when an input pulse is applied to the SUBTRACT input means. This can be readily seen by reference to FIG. 3. When the input means 7 is actuated to its lower position contactors 10, 11 and 23 are moved to their lower positions and the circuits to both coils 1 and 3 are opened. Upon release of the input pulse both coils 1 and 3 will again be energized to actuate their contactors to their opposite positions from which they occupied before the input pulse was applied to the SUBTRACT input means. If both contactors 2 and 4 were open indicating 00 on the register they would both be closed to indicate 11 on the register. If the register read 01 prior to the subtract input, the register would then read 00 at the completion of the subtract input signal. In this operation, the lower position of the contactor 5 makes the holding circuit to the coil 1 effective.

The embodiment of FIG. 3 thus accomplishes the same counting operations as that shown in FIG. 2, the provision of the extra contactors 22 and 23, providing holding circuits for the bi-stable device $Y_1$ as required because the bi-stable devices initially are both energized. In the embodiment of FIG. 2 only the bi-stable device $Y_2$ is initially energized and no such holding circuit is required to realize the same counting operation.

To understand the mode of operation depicted in table 3 of FIG. 1 and that performed by the embodiment shown in FIG. 4, it is necessary to have in mind the nature of the Gray code, which the apparatus is designed to accomplish. The Gray code is a progressive code, that is, only one digit or place changes with the entrance of an input pulse as distinguished from the binary code wherein there may be simultaneous changes in more than one of the places or digits. This code makes for simplicity of structure and operation and is sometimes preferred. For ready reference the Gray code is compared below with the Binary code.

| Decimal equivalent | Gray code | Binary code |
|---|---|---|
| 0 | 0000 | 0000 |
| 1 | 0001 | 0001 |
| 2 | 0011 | 0010 |
| 3 | 0010 | 0011 |
| 4 | 0110 | 0100 |
| 5 | 0111 | 0101 |
| 6 | 0101 | 0110 |
| 7 | 0100 | 0111 |
| 8 | 1100 | 1000 |
| 9 | 1101 | 1001 |
| 10 | 1111 | 1010 |

As will be seen above, when the count in the binary code changes from seven to eight there are four digital changes, whereas in the Gray code there is only one change, that is in the fourth place digit. For operation in the Gray code the $Y_1$ and $Y_2$ bi-stable devices as shown in FIG. 4, must of necessity operate alternately as distinguished from the operation that is obtained for the binary code wherein first the $Y_2$ bistable device is operated and then the two $Y_1Y_2$ bi-stable devices are operated together. This pattern is repeated for the first two digits or places. When a progress to the third and fourth digit is desired, the third digit is operated upon on the fourth count. In the Gray code, the progression is similar from right to left through the different digits.

Referring to FIG. 4, the ADD input device 6 is mechanically connected to three contactors 8, 9 and 22 and the SUBTRACT input device 7 is mechanically connected to contactors 10, 11 and 23. Each of the contactors as represented by the short arcuate lines applied to their movable ends, are of the make-before-break type. In other words, the lower contacts are engaged by the movable contactors before the upper contacts are disengaged and vice versa.

Contactors 8, 9, 22 and 23 are connected to ground and through ground to one terminal of the source of voltage as represented by the battery 20. The upper and lower stationary contacts of the contactor 8 are connected respectively by conductors 12 and 13 to the upper and lower stationary contacts of the contactor 10. The upper and lower stationary contacts of the contactor 9 are respectively connected by conductors 14 and 15 to the upper and lower stationary contacts of the contactor 11. The upper stationary contact of the contactor 22 is connected by conductor 57 to the lower stationary contact of the contactor 23 and the lower stationary contact of the contactor 22 is connected by the conductor 56 to the upper stationary contact of the contactor 23.

The bi-stable devices $Y_1$ and $Y_2$ respectively have coils 1 and 3 which according to the system adopted cause the actuation of the contactors associated therewith at the beginning of the input pulse to the coils thereof.

The bi-stable device $Y_1$ has associated therewith and which are operated thereby the contactors 31, 23, 33, and 34 along with contactor 2. Contactors 31–34 are of the make-before-break type. The bistable device $Y_2$ has associated therewith the contactors 35, 36, 37 and 38 as well as contactor 4. The contactors 35–38 are also of the make-before-break type. The upper and lower stationary contacts of the contactor 31 are connected respectively by conductors 41 and 42 to the upper and lower stationary contacts of the contactor 35. The upper and lower stationary contacts of the contactor 32 are respectively connected by conductors 44 and 43 to the lower and upper stationary contacts of the contactor 36. Contactors 31 and 32 are connected together and by conductor 55 to the upper stationary contact of the contactor 22. The upper and lower stationary contacts of the contactor 33 are connected respectively by conductors 46 and 47 to the upper and lower stationary contacts of the contactor 37. The upper and lower stationary contacts of the contactor 34 are connected respectively by conductors 49 and 48 to the lower and upper stationary contacts of the contactor 38. The contactors 33 and 34 are connected together and by conductor 54 to the lower stationary contact of the contactor 22.

One terminal of each of the relay coils 1 and 3 are connected by conductor 19 to the source of voltage as represented by the battery 20. The other terminal of the coil 1 is connected to the contactor 11 and by conductor 52 and 51 to the contactors 36 and 37. The other terminal of the relay coil 3 is connected to the contactor 10 and by conductors 53 and 50 to the contactors 35 and 38.

As in the previous embodiment the contactors 4 and 2 respectively represent the first and second digits or places in the counter register, being 00 when the contactors are open and 11 when the contactors are closed. These contactors may as intended be connected in circuits to visual indicating means such as lights or drops or the like.

As shown in FIG. 4, the contactors 2 and 4 are open, thereby showing that there is no count registered. The contactors 4 and 2 in that order represent the first and second places or digits of the Gray code. Also as shown, the input means 6 and 7 are at their stable positions, that is, their upper positions representing that there is no input being applied to the counter. In this initial state of the counter, both relay coils 1 and 3 are energized, the circuits are complete and current is passing through them. Coil 1 has its circuit completed by way of contactor 11, conductor 14, and contactor 9 to ground and also by a holding circuit represented by conductor 52, conductor 51, contactor 37, conductor 46, contactor 33, conductor 54, conductor 56 and contactor 23 to ground. Coil 3 has its circuit completed through contactor 10, conductor 12, contactor 8 to ground and also by the holding circuit represented by conductors 53 and 50, contactor 35, conductor 41, contactor 31, conductor 55 and contactor 22 to ground. Contactors 36 and 38 are at the same moment connected to an open circuit via conductors 43 and 48 respectively.

When there is an input pulse applied to the ADD input means 6, as when it is being pressed down to its lower position against the bias of the spring, contactors 8, 9 and 22 are moved into engagement with their lower stationary contacts. As will be seen, contactors 8 and 9 move into engagement with contacts connected with conductors 13 and 15 to open circuits at contactors 10 and 11. As a consequence, the circuits through the contactors 8 and 9 are broken. Were it not for the holding circuits both of the coils 1 and 3 would be deenergized. As it is, only the holding circuit to the coil 3 is broken by the contactor 22 while the holding circuit to the coil 1 remains unbroken during the application and release of the first input pulse. The circuit from coil 3 can be traced through conductor 50, contactor 35, conductor 41, contactor 31, conductor 55 and the upper stationary contact of the contactor 22, which is no longer engaged by the contactor 22 while it is in its lower position. On the other hand, the circuit from coil 1 can be traced through the conductor 52, and 51, contactor 37, conductor 46, contactor 34, conductor 56, contactor 23 to ground and it remains unbroken because the contactor 23 is not disturbed. As a consequence, the coil 3 becomes deenergized upon the application of the input pulse and when it is released, as represented by the return of the push-button to its upper position, the coil becomes reenergized. This causes the contactor 4 to close to represent a 1 in the first place digit of the register while the second place digit remains at 0. Contactors 35, 36, 37 and 38 are also moved with the contactor 4 into engagement with their lower stationary contacts. This operation prepares the holding circuits to the coil 1 for interruption upon the application of the second input pulse and for the coil 3 to remain energized. Upon release of the second input pulse, the coil 1 is reenergized to shift the contactor 2 to the closed position.

For this second operation, effected by the second input pulse, contactors 35–38 inclusive are in their lower positions. The holding circuit to the coil 1 is now established from the coil 1 via conductor 52, contactor 36, conductor 44, contactor 32, conductor 55 to the upper stationary contact of the contactor 22. Thus, when the second input pulse is applied, the contactor 22 leaves the upper contact and opens the circuit. On the other hand, the circuit from the coil 3 as established, at the same time, is now through conductors 53 and 50, contactor 38, conductor 49, contactor 34, conductors 54, 56, and contactor 23 to ground. Since no one of the contactors of the $X_1$ input device are in this circuit the coil 3 remains energized during the whole of the second input pulse.

Upon release of the second input pulse to the ADD input means $X_1$, the contactors thereof are returned to their upper stable position and the circuit to the coil 1 is again established, which causes the contactors 2 and 31 to 34 inclusive to be moved into engagement with their lower stationary contacts. This operation of the contactors 31 to 34 inclusive now reverses the connections of the holding circuits so that when the third input pulse is applied to the ADD input means $X_1$ the coil 3 will be de-energized and reenergized whereas the coil 1 will remain energized during the complete third input cycle. At the conclusion of the second input pulse operation, the contactors 2 and 4 are both closed representing the reading on the register of 11 having a decimal value of 2 according to the Gray code. Upon completion of the third input pulse the contactor 4 is again opened to produce a reading on the register of 10 which represents the decimal value of 3.

As stated above, at the conclusion of the second input pulse, the contactors 31 to 34 are now in their lower positions, and the contactors 35 to 38 are also in their lower positions, having been moved there by the operation effected during the first two input pulses. In this state of the contactors, the holding circuit from the coil 3 is now established, through conductors 53, 50, contactor 35, conductor 42, contactor 31, conductor 55 and contactor 22 to ground. When the third input pulse is applied the circuit to coil 3 will thus be broken by contactor 22. On the other hand, the holding circuit for the coil 1 is established through conductors 52 and 51, contactor 37, conductor 47, contactor 33, conductor 54, conductor 56 and contactor 23 to ground. Since no contactor of the input device $X_1$ is involved in the latter circuit the coil 1 will remain energized during the complete third input pulse operation. Upon release of the input pulse the register is now changed by the opening of the contactor 4 to read 10, representing the decimal value of 3, and the contactors 35 to 38 inclusive are also moved back into engagement with their upper stationary contacts to again reverse holding circuits for the fourth input pulse.

The application and release of the fourth input pulse will in the system shown in FIG. 4, wherein there are only two places of the Gray code accounted for, return the counter register to the reading of 00 indicating that the counter register has run its limit. In the actual structure having at least four places or digits, additional circuits would be provided that the fourth input pulse would produce a change in the third place digit to 1 and a hold of the first and second place digits so that the register would read 0110 in accordance with the requirements of the Gray code. The circuit for this operation is not disclosed in FIG. 4, it being sufficient for the purposes of the disclosure of the invention to show only two stages and a two place register.

If instead of an ADD input pulse being applied, suppose a SUBTRACT input pulse is applied when the register initially reads 00, which in this structure can represent the decimal value of 0 or 4. This SUBTRACT input pulse is applied through the push-button 7 representative of the SUBTRACT input means $X_2$.

As before, the contactors 10 and 11 operate like contactors 8 and 9 to break one of the circuits to each of the coils 1 and 3 of the bi-stable devices $Y_1$ and $Y_2$. With contactors 31 to 34 and 35 to 38 inclusive in engagement with their upper stationary contacts, the holding circuit for coil 3 will be through conductor 50, contactor 35, conductor 41, contactor 31, conductor 55, and contactor 22 to ground. Since now the contactor 22 is not operated during the SUBTRACT input pulse, the coil 3 will remain energized during the first SUBTRACT input pulse. On the other hand, the holding circuit for the coil 1 is through the conductors 52, 51, contactor 37, conductor 46, contactor 33, conductors 54, 56 and contactor 23 to ground. When now the first input pulse is applied to the SUBTRACT input means $X_2$ the contactor 23 will be opened to open the circuit to the coil 1 and thereby de-energize it. Upon release of the input pulse, the coil 1 is re-energized causing the bi-stable device $Y_1$ to be operated to cause the contactors 2 and 31–34 inclusive to be moved to their lower positions. Contactor 2 being closed produces a register reading of 10 which according to the Gray code is equal to the decimal value of 3. Thus, it will be seen the application of an input pulse to the SUBTRACT input means 7 effects a reversal in the sequence of the operation of the counter.

A second input pulse to the SUBTRACT input means $X_1$ will produce a closing of contactor 4 to cause the register to then read 11 which is equal to the decimal value of 2 and which is one less from the decimal value of 3. This operation will be obvious from the above described operation without the necessity of carrying the description further in this respect.

Up to the present, the contactors 8 to 11 inclusive have effected little change in the operation of the bi-stable devices $Y_1$ and $Y_2$, since the holding circuits seem to exert all control over the sequence of the operation of the bi-stable devices. They are, however, important when through inadvertence or accident both the ADD and SUBTRACT input means are simultaneously actuated. In this case, it will be seen that the contactors 8 to 11 inclusive become effective to take over control of the bi-stable devices to prevent their de-energization and thus prevent a change in the reading of the register. For example, suppose both input devices have pulses applied thereto, contactors 8 to 11 inclusive will each be moved into engagement with their lower stationary contacts and since the contactors are of the make-before-break type the circuits controlled by these contactors will remain completed throughout the operation.

If, one the other hand, both applications of the pulses are simultaneous but their releases are in sequence, the register will be operated in accordance with which of the input devices is last released. If the ADD input device is last released, then the register will be operated to register an added count. On the other hand, if the SUBTRACT input device is the last released the register will be operated to read one less count than it had theretofore.

Table 3 pertaining to the mode of operation of the embodiment of FIG. 4 and to the Gray code shows in the 00 vertical column a series of 11 for each of the boxes. This indicates that with no input applied to either of the input devices the coils of the bi-stable devices $Y_1Y_2$ remain energized. As will be recalled, this is exactly the condition that prevails. The second column to the right, headed by 01 to represent an input of a SUBTRACTION pulse, shows that when the register reads 00 the $Y_1$ bi-stable device will be energized. This, as it will be recalled, is exactly what happens in the operation of the structure of FIG. 4 to effect a change in the reading of the register $y_1y_2$ from 00 to a 10 reading, 10 representing the decimal value of 3 and in the structure of FIG. 4, 00 represents the decimal value of either 0 or 4 in the two place digit system. When the register reads 10, that is when $y_1$ is closed and $y_2$ is open, an input to the SUBTRACT input means will de-energize the $Y_2$ bi-stable device $y_2$ to close to produce a reading on the register of 11 representative of the decimal value of 2.

The third column from the left side represents what happens when there is a simultaneous input to each of the $X_1X_2$ input devices. As can be seen in each of the boxes of the column, the symbols 11 appear, representing that coils 1 and 3 remain energized. The symbol 0 represents when the coil of the bi-stable device is de-energized. The fourth column represents what happens to the energization of coils for each reading of the register when the ADD input pulse is applied. With this explanation, the mode of operation of the apparatus of FIG. 4 is in brief completely disclosed by table 3.

FIG. 5 represents another arrangement for contactors and bi-stable devices for accomplishing the same sequential operation as is accomplished by the embodiment of FIG. 4. The ADD input device $X_1$ push-button means 6 and contactors 8, 9, 22 and 91 are connected together for simultaneous operation. The SUBTRACT input device $X_2$ comprises push-button 7 and contactors 10, 11, 23 and 95. They are also connected together mechanically for simultaneous operation. As will be seen in FIG. 5, there are two additional contactors one for each input device $X_1$ and $X_2$. Contactors 9, 22, 91, 95, 23 and 10 are connected to ground. The upper and lower stationary contacts of the contactor 8 are respectively connected by conductors 12 and 13 to the upper and lower stationary contacts of the contactor 10. The upper and lower stationary contacts of the contactor 9 are respectively connected by conductors 14 and 15 to the upper and lower contacts of the contactor 11. The upper and lower stationary contacts of the contactor 22 are connected respectively by conductors 57 and 56 to the lower and upper stationary contacts of the contactor 23. The upper and lower stationary contacts of the contactor 91 are respectively connected by conductors 92 and 93 to the lower and upper stationary contacts of the contactor 95.

Each of the bi-stable devices $Y_1$ and $Y_2$ are provided with four contactors in addition to the contactors 2 and 4. The bi-stable device $Y_1$ has contactors 61 to 64 inclusive and the bi-stable device $Y_2$ has the contactors 65 to 68 inclusive. The upper and lower stationary contacts of the contactor 61 are connected respectively by conductors 71 and 72 to the lower and upper stationary contacts of the contactor 65. The upper and lower stationary contacts of the contactor 62 are respectively connected by conductors 73 and 74 to the upper and lower stationary contacts of the contactor 66. The upper and lower stationary contacts of the contactor 63 are connected respectively by conductors 75 and 76 to the upper and lower stationary contacts of the contactor 67. The upper and lower stationary contacts of the contactor 64 are respectively connected by conductors 78 and 79 to the lower and upper stationary contacts of the contactor 68. Contactor 11 is connected by conductor 83 to the contactors 67 and 68 and in turn connected to one terminal of the coil 1 of the bi-stable device $Y_1$. The contactor 8 is connected by conductor 81 to the contactors 65 and 66 and they in turn are connected to the coil 3 of the bi-stable device $Y_2$. Contactor 61 is connected by conductor 82 to the upper stationary contact of contactor 23. Contactor 62 is connected by conductor 84 to the lower stationary contact of the contactor 23. Contactor 63 is connected by conductor 85 to the upper stationary contact of the contactor 95 and contactor 64 is connected by conductor 86 to the lower stationary contact of the contactor 95. As in the other embodiments, the coils are connected at their other terminals by conductor 19 to one terminal of a source of voltage as is represented by the battery, the other terminal of the source of voltage being connected to ground.

This embodiment also operates to perform a counting operation in accordance with the requirements of the Gray code and the mode of operation set forth in table 3 of FIG. 1. Also, the circuits of each coil 1 and 3 are completed by two different distinct paths for each, to initially energize the coils.

The circuits for coil 1 can be traced through contactor 67, conductor 75, contactor 63, conductor 85 and contactor 95 to ground and also through conductor 83, contactor 11, conductor 14, contactor 9 to ground. While contactors 68 and 64 are in their upper positions contactor 68 is connected to an open circuit by conductor 79.

The circuit for coil 3 can be traced through contactor 66, conductor 73, contactor 62, conductor 84, conductor 57, contactor 22 to ground and also through conductor 81, contactor 8, conductor 12, contactor 10 to ground. While contactors 65 and 61 are in their upper positions contactor 65 is connected to an open circuit by conductor 72.

According to table 3 of FIG. 1 column 1 on the left, each of the coils 1 and 3 are energized when there is no input pulse applied to the ADD and SUBTRACT input devices $X_1$ and $X_2$. This is indicated by the symbol 11 appearing in each of the boxes of the first column. Referring to the last column or the one on the extreme right of the table 3, as previously described identified as by 10 above the column, represents the operations effected by an input pulse applied to the ADD input means $X_1$ for each condition of the register represented by the contactors $y_1$ and $y_2$ or as otherwise identified by 2 and 4.

An input pulse applied to the ADD input means $X_1$ while $y_1y_2$ are 00 according to the table effects a de-energization of the coil 3 of the bi-stable device $Y_2$. The application of the pulse moves the contactors 8, 9, 22, and 91 into engagement with their lower stationary contacts and the release returns them to engagement with their upper stationary contacts. Accordingly, the circuit from the coil 3 through conductor 81, conductor 8, conductor 12, contactor 10 and conductor 87 to ground is opened by the contactor 8 being moved to its lower position. The circuit from coil 3 through contactor 66, conductor 73, contactor 62, conductor 84, conductor 57, contactor 22 to ground is also broken. Coil 3 will thus be de-energized by the application of an input pulse to the ADD input device $X_1$.

Coil 1, on the other hand, must remain energized as dictated by the sequence of the Gray code. As will be seen, the circuit to coil 1 remains unbroken along the path through contactor 67, conductor 75, contactor 63, conductor 85, and contactor 95 to ground, whereas the other circuit is broken by the contactor 9 being moved to its lower position. When the input pulse is released or removed the coil 3 will be reenergized and this will effect the operation of the contactors associated therewith, moving them to their lower position and the contactor 4 to closed position. Contactor 2 remains open since coil 1 was not at this time de-energized. The register now reads 01, as is required by the Gray code, to represent the decimal value of 1.

Contactors 65 to 68 being moved into their lower positions by the re-energization of the coil 3 prepares the circuit to coil 1 to be broken and the circuit to coil 3 to be maintained during the application of the second input pulse to the ADD input device $X_1$.

When the second input pulse is applied to the ADD input device $X_1$ the circuit to coil 1 will be broken while the circuit to the coil 3 will at this time remain unbroken as indicated by the 01 symbols in the second box from the top in the last column from left of table 3 showing that $Y_1$ is de-energized and $Y_2$ remains energized. Again, the circuit from coil 1 is traced under this new circumstance with contactors 65–68 in their lower position as follows, through contactors 68, conductor 78, contactor 64, conductor 86, conductor 92, and contactor 91 to ground. Since the application of the second input pulse contactor 91 moves out of engagement with its upper stationary contact, this circuit just traced is broken. Also, the other circuit from coil 1 conductor 83, contactor 11, conductor 14, and contactor 9 to ground is also broken by contactor 9 being moved into engagement with its lower stationary contact. Thus, the application of the second input pulse effects a de-energization of coil 1 of the bi-stable device $Y_1$. Upon release of the input pulse the bi-stable device $Y_1$ operates to effect an operation of the contactor 2 and the contactors 61 to 64 inclusive into their lower positions. Contactor 2 being closed with contactor 4 already closed by the first count input operation, the register now reads 11 as is required by the Gray code for a decimal value of 2. The contactor 4 was not moved during the application and release of the second input pulse because the circuit to ground through contactor 65, conductor 71, contactor 61, conductor 82, contactor 23 and conductor 88 remains unbroken, even though the other circuit to the coil 3 was broken.

The operation of the bi-stable device $Y_1$ by the application and release of the second input pulse to the ADD input means X, operates the contactors 61 to 64 inclusive moving them into engagement with their lower stationary contacts to prepare the circuit to the coil 3 of the bi-stable device $Y_2$ for operation during the third input pulse. Accordingly, the third box from the top of the last column from the left of table 3 shows the bi-stable device $Y_2$ is required to be de-energized during the application of the third input pulse to the ADD input means.

Contactors 61 to 68 prior to the third input pulse are each in their lower positions. The circuit from coil 3 is completed through contactor 66, conductor 74, contactor 62, conductor 84, conductor 57 and contactor 22. Contactor 22 opens the circuit during the application of the third input pulse to the ADD input means. The other circuit from the coil 3 including conductor 81, contactor 8, conductor 12, contactor 10 and conductor 87 to ground is likewise opened by contactor 8 on the application of the third input pulse to the ADD input means. Thus, coil 3 will be de-energized and upon release of the third input pulse will be re-energized to move the contactors associated therewith into engagement with their upper stationary contacts.

The circuit from coil 1 on the other hand will remain completed through the path including the contactor 67, conductor 76, contactor 63, conductor 85, contactor 95, and conductor 88 to ground, while the other circuit to coil 1 is broken by contactor 9. The register represented by contactors 2 and 4 now reads 10 as required in the Gray code for the decimal value of 3.

As in the embodiment of FIG. 4 the embodiment of FIG. 5 runs out at its register on the application of the fourth input pulse to the ADD input means $X_1$ and the register returns to the 00 reading. When more stages are used, as will be the case in the actual structure the fourth input pulse will provide a change in the third place digit from the right and a hold for coils 1 and 3 so that the register will read 0110 upon the completion of the fourth input pulse. The fifth input pulse will again cause actuation of the bi-stable device $Y_2$.

The embodiment of FIG. 5 also operates in a manner similar to that described for FIG. 4 when an input pulse is applied to the SUBTRACT input means $X_2$. The only difference as compared with the input pulse applied to the ADD input device $X_1$ is in the order of de-energization of the coils 1 and 3 of the bi-stable devices. As will be seen in table 3 second column from the left as compared with the fourth column, the input pulse to the SUBTRACT input means 7 effects a reversal of the order of de-energization of the coils 1 and 3. This produces the proper change in the register of the counter to indicate one less count after each input pulse to the SUBTRACT input means $X_2$.

Simultaneous inputs to both the ADD and SUBTRACT input devices will effect no change in the reading of the register of the counter. However, should the release of the inputs be not simultaneous but sequential, the register will be changed to read one more or one less according to which of the input devices is last released. As in the previous embodiments, in case the operator discovers that he has inadvertently applied an input to both input means he can correct his mistake by releasing the proper input means last in sequence, or he can simultaneously release them and then apply the proper input pulse to the proper input means.

The circuit illustrated in FIG. 6 shows one example of a system having more stages than those in the preceding embodiments of the invention, whereby the register will provide for a greater range of operation. The output signals of the several stages would be achieved by simply adding contacts. This, however, would increase the number of contacts that it may be advantageous to add relays to the system even at the cost of sacrificing part of the speed in the overall operation incident to the use of contactors. This might cancel out some of the economy in time of operation which is one of the main advantages of this invention. But again, this change would be optional depending upon the specific application for which the counter is to be used. The circuit of FIG. 6 is one typical application of two interconnected parts forming four stages where input relays X are employed with ADD and SUBTRACT input means $X_3$ and $X_4$ which provides for inputs thereto by either the CARRY operation from the first two stages or by direct input through manually manipulative means 136 and 137.

The function of the relays, as indicated above, may if desired be accomplished directly by addition of contactors to the input and output means.

Referring now to FIGS. 6 and 7 there is a counter disclosed in which there are four stages or one for each place or digit of the Natural binary code shown in FIG. 7.

The structure of FIG. 6 is a substantial carrying forward of the invention shown in FIG. 3 into a four stage, four place or four digit counter.

There are two input devices for each two stages as for example $X_1X_2$ for the first two stages and $X_3X_4$ for the other two stages. There are also four outputs or digits in the register which would represent the register reading from right to left as $y_2y_1y_4$ and $y_3$, with their respective coils 3, 1, 141 and 140, together with the associated contactors forming bi-stable devices $Y_2Y_1Y_4$ and $Y_3$.

As shown, the counter is designed to operate in the manner depicted in FIG. 7 to produce the counts shown therein for the various decimal values. For the first count $y_2$ must be closed and $y_1y_4$ and $y_3$ must remain open. For the second input $y_2$ must again open and $y_1$ must close. For the third input $y_1$ remains closed and $y_2$ closes and for the fourth input both $y_2$ and $y_1$ are opened and $y_4$ is closed. For the fifth, sixth and seventh inputs the $y_4$ remains closed and the cycle for $y_1y_2$ is repeated. For the eighth input pulse $y_3$ is closed and $y_1y_2$ and $y_4$ are open. For the ninth and tenth inputs the cycle on the $y_1y_2$ outputs repeats.

FIG. 6 shows a counter having in addition to input devices for ADD and SUBTRACT $X_1X_2$ and additional input means $X_3$ and $X_4$. The circuit is also arranged to produce a carry operation from the first two stages to the second two stages at the appropriate moment or stage in the counting operation as, for example, on the fourth and eighth input pulses.

The input devices $X_1$ comprise a push-button device 6 two double acting contactors 8, 9 and three single acting contactors 22, 101 and 102. Input means $X_2$ is similarly provided with an actuating means 7, two double acting contactors 10 and 11 and three single acting contactors 23, 103 and 104. Contactors 8, 9, 22, 23, 101 and 102 are connected to ground. The upper and lower stationary contacts of the contactor 8 are connected respectively by conductors 12 and 13 to the upper and lower stationary contacts of contactor 10. Similarly the upper and lower stationary contacts of the contactor 9 are connected respectively by conductors 14 and 15 to the upper and lower stationary contacts of the contactor 11. Contactor 10 is connected by conductor 112 to the coil 1 of the bi-stable device $Y_1$ and contactor 11 is connected by conductor 111 to the coil 3 of the bi-stable device $Y_2$. It should here be noted that coils 1 and 3 are initially energized and that each and every input pulse applied to the ADD or SUBTRACT device $X_1X_2$ will result in the operation of the bi-stable device $Y_2$, since coil 3 has no holding circuit. This is in accordance with the $Y_2$ column of table in FIG. 7, wherein the digit changes alternately from 0 to 1 and back to 0 as the count progresses from 1 to 10.

The bi-stable device $Y_1$ has coil 1 and three contactors 2, 105 and 108 and the bi-stable device $Y_2$ has coil 3 and four contactors 4, 5, 106 and 109. Contactors 105 and 106 each have an upper stationary contact and contactors 108 and 109 have a lower stationary contact. The contactor 5 is a double acting make-before-break type, providing a control of the bi-stable device $Y_1$.

The upper stationary contact of contactor 22 is connected by conductor 24 to the lower stationary contact of contactor 5 and the upper stationary contact of the contactor 23 is connected by conductor 25 to the upper stationary contact of the contactor 5. The contactor 5 is connected also to coil 1 of the bi-stable device $Y_1$. Thus far, the structure is similar to that shown in FIG. 3.

Contactor 101 is normally in engagement with an upper stationary contact when no input is applied and stationary contact of contactor 101 is connected to the lower stationary contact of the contactor 103, which is normally out of engagement therewith when no input pulse is applied to the SUBTRACT input means $X_2$. Also, contactor 102 is normally out of engagement with its lower stationary contact when no input pulse is applied to the ADD input means $X_1$. This lower stationary contact is connected to the upper stationary contact of contactor 104, with which contactor 104 is normally in engagement when no input is applied to $X_2$.

Contactor 103 is connected to the upper stationary contact of contactor 105, connected in turn by conductor 107 to the contactor 106, the upper stationary contact of which is connected by conductor 113 to coil or relay device 139 of the input device $X_4$.

Contactor 104 is connected to the contactor 108. The lower stationary contact of the contactor 108 is connected by conductor 110 to the lower stationary contact of the contactor 109. Contactor 109 is connected to the coil 138 of the ADD input means $X_3$.

Relays 138 and 139 are normally de-energized and are connected mechanically to actuate the input means $x_3$ and $x_4$ respectively in response to energization from contactors 101–104, under certain conditions of the output means $y_1$ and $y_2$. In other words, the contactors 101–104 are ineffective to energize relays 138, 139 until as for example the output devices $y_1$ and $y_2$ are in their 11 positions closing contactors 108, 109. Contactor 101 operates through contactors 108, 109 to energize coil 138, whereas contactor 101 operates through contactors 103, 105, 106 to energize coil 139 when the inputs are applied to the input means $X_2$.

The input devices $X_3$ and $X_4$ also respectively have push-buttons 136, 137 by which inputs may be directly impressed. In addition the ADD input devices $X_3$ are provided with two double acting make-before-break contactors 116, 118 and a single acting contactor 117. Input device $X_4$ is provided with two double acting make-before-break contactors 119 and 120 and a single acting contactor 121.

Contactors 116, 118, 117 and 121 are connected to ground by conductor 115.

The upper and lower stationary contacts of contactors 116 are connected respectively by conductors 122 and 123 to the upper and lower stationary contacts of the contactor 119. The upper and lower stationary contacts of contactor 118 are connected respectively by conductors 124, 125 to the upper and lower stationary contacts of the contactor 120.

Contactor 119 is connected by conductor 129 to coil 140 of the bi-stable device $Y_3$ and contactor 120 is connected by conductor 131 to the coil 141 of bi-stable device $Y_4$. The coil 140 is the actuating means for output contactor 142.

The coil 141, in turn, is the actuating means for contactors 144 and 128. The upper stationary contacts of contactors 117 and 121 are connected respectively by conductors 126, 127 to the lower and upper stationary contacts of the contactor 128.

Bi-stable devices $Y_1$, $Y_2$, $Y_3$, $Y_4$, operate upon energization to activate the contactors associated therewith from one position they occupy prior to the energization to the other of their two possible positions. The energization of the bi-stable devices causes the actuation while the de-energization does not disturb their position.

Contactors 101, 102, 103, 104, 105, 106, 108, 109 operate in a manner to provide a carry over of the count from the first two stages to the third and fourth. The arrangement is also such that an input pulse may be applied directly to the input devices $X_3$ and $X_4$. An input pulse to the input means $X_3$ and $X_4$ is the equivalent to four input pulses applied to the input means $x_1$ and $x_2$.

The arrangement shown in FIG. 6 operates in the following manner. Initially the relay coils 1 and 3, 140 and 141, are energized. The circuits to the coils 138 and 139 being open they are initially de-energized and are normally so.

The circuit from the coil 3 is completed to ground through conductor 111, contactor 11, conductor 14 and contactor 9. Each time an input pulse is applied to input device $X_1$ the coil is de-energized to cause the contactors 4, 5, 106, 109, to be moved to the positions opposite the position which they occupy prior to the input.

The circuit for coil 1 is through two paths, one by conductor 112, contactor 10, conductor 12, contactor 8 to ground, the second by conductor 112, contactor 5, conductor 25, contactor 23, conductor 100 to ground. Thus the circuits to coils 1 and 3 are initially complete and the coils are energized. Also, the circuit to coil 3 is first broken and then completed to de-energize and re-energize it on every input to the ADD input means $X_1$.

The first input to $X_1$ by the push-button 6 produces, upon release of the first input pulse or return of the button 6 to its original position, its re-energization. Re-energization of coil 3 causes bi-stable device $Y_2$ to actuate the contactors associated therewith to their opposite position, or in this case, to their lower positions, to close contactor 4, to bring contactor 5 into engagement with its lower stationary contact, to move contactor 106 out of engagement with its upper stationary contact and to move contactor 109 into engagement with its lower stationary contact. This causes the register as represented by the contactors 4, 2, 144 and 142 to respectively represent 0001.

The circuit to coil 1 during the first input pulse remains unbroken in one of its two paths, as that through contactor 5, conductor 25 and contactor 23.

With contactor 5 in its lower position, it will now be seen at the completion of the first input pulse, that the holding circuit for coil 1 of bi-stable device $Y_1$ is changed to the path via conductor 24, and contactor 22 so that upon application of the second input pulse, the circuit to coil 1 will also be broken. Thus, upon application of the second input pulse, the circuit to both coils 1 and 3 will be broken and upon release of the second input pulse both coils will be re-energized to cause contactors 4, 5, 106 and 109 to be moved to their upper positions and contactors 2, 105 and 108 to be moved into their lower positions. The contactor $y_1$ will thus be closed, whereas contactors $y_2y_4y_3$ will be open, $y_2$ having been moved from the closed position where it was at the conclusion of the first input pulse. Referring to FIG. 7, it will be noted that for the count of 2 the register must read 0010 and since $y_4y_3$ and $y_2$ are open, which by the assumed convention represents 0 and with $y_1$ closed, the operation is as required for the Natural binary code.

Until now in the operation of the counter arrangement, the circuits to relay coils 138 and 139 remain open and no CARRY input is transferred thereby. This can be seen as follows, contactor 101 is opened on every input pulse, contactor 103 is open when no input pulse is applied to $X_2$ and contactors 105 and 106 are closed. The circuit via 113 to coil 139 is thus open. The circuit to coil 138 is open by reason of the contactors 102, 108 and 109 being open. Coil 138 is energized only when contactors 108 and 109 are in their lower positions or when contactors 2 and 4 are both closed and an input pulse is applied to the input means $X_1$.

Upon application of the third input pulse coil 3 is again de-energized and coil 1 remains energized as is seen by movement of contactor 8 into its lower position. The circuit to coil 1 remains complete through contactor 5 (upper position) conductor 25 and contactor 23 to ground. Upon release of the third input pulse the coil 3 is re-energized to move the contactors 4, 5, 106 and 109 into their lower positions. Thus the register is now changed from 0010 to 0011 as seen by closed position of contactors 2 and 4.

At this point in the operation, it is well to note that both contactors 108 and 109 are now in their lower positions in engagement with their stationary contacts completing a portion of the circuit to the coil 138 from contactor 104, contactors 108 and 109. Contactor 102 being open, coil 138 remains de-energized until the application of the fourth input pulse.

Upon application of the fourth input pulse, the coils 1 and 3 are de-energized and the circuit to coil 138 is closed. This coil 138 now actuates the contactors 116, 118 and 117 into their lower positions to open the circuit to coil 141 of bi-stable device $Y_4$. Upon release of the fourth input pulse the coils 1 and 3 are re-energized to shift contactors 2 and 4 and their respective associated contactors into their upper positions. Also, upon release of the fourth input pulse, the circuit to coil 138 is opened at contactors 102, 108 and 109 so that contactors 116, 118, and 117 are automatically returned to their released positions, as by spring means associated with the push-button means 136. This in turn effects a re-energization of coil 141 to cause it to close contactor 144 or $y_4$ and to move contactor 128 into its lower position.

Thus the register at the end of the fourth input pulse reads 0100 because the contactors $y_3y_4y_1y_2$ are respectively open, closed, open and open.

Contactor 128 is similar in function to contactor 5, it prepares the circuit for coil 140 for actuation when there is a second input pulse applied through the carry circuit to coil 138, or when there is a second input applied through the input means 136. Consequently, an eighth input applied to the input means 6 will produce an actuation through bi-stable device $Y_3$ of contactor 142 or $y_3$ at the same time as contactors 2, 4 and 144 are returned to their open positions.

The operation of the subtract input means 7 effects a similar sequential operation of the contactors 2, 4, 142 and 144 but in an order which is the reverse of that which is obtained by the input means 6. For example, let the register be assumed to read 1000, wherein $y_3=1$ and $y_4y_1=0$. Operation of the input means 7 will operate to open the circuit to coils 3, 1, 140 and 141. As will be seen, the circuits through contactors 10 and 23 being opened by an input pulse to means 7, de-energization of coil 1 of bi-stable device $Y_1$ is effected; the circuit through to the coil 3 of bi-stable device $Y_2$ is broken; the circuit through contactor 103 is established to energize relay coil 139 through contactors 101, 103, 105 and 107, contactor 106 and conductor 113. This coil 139 immediately actuates the input means 137 which moves the contactors 119, 120, 121 to their lower positions to similarly de-energize both coils 140 and 141. Upon release of the input to input means $X_2$ the coils 1, 3, 140, 141 are re-energized and coil 139 is deenergized causing the contactors 2, 4 and 144 to be closed and contactor 142 which was previously closed to be opened, to provide a reading on the register as represented by said contactors to read 0111 the equivalent of a decimal value of 7.

The register as disclosed has a capacity of 15 and should a SUBTRACT input pulse be applied and released while the register reads 0000, the operation of the system will produce a reading of 1111, the equivalent of a decimal value of 15, because the reading 0000 can represent either the decimal value of 0 or 16.

In the arrangement of FIG. 6, suppose it is desired to subtract a decimal value from a decimal value of 15, or a binary reading of 0111 from a binary reading of 1111. First the register is made to read 1111, representing a decimal value of 15. If the register previously read 0000, this can be done by introducing and releasing a single input pulse to the input means $X_2$. After the aforesaid operation, the contactors 2, 4 and 144 will be closed, contactors 105 and 106 will be open and contactors 108 and 109 will be closed. Also, contactors 128 and 5 will be in engagement with their lower stationary contacts. With the contactors in the aforesaid positions, the application and release of an input pulse to the input means $X_4$ will cause the register to read 1011 or the equivalent of the decimal value of 11, as an input pulse applied to the input means $X_4$ produces a count which is the equivalent of four input pulses to the input means $X_2$. Now with the register reading 1011 three input pulses applied to the input means $X_2$ will cause the register to read successively 1010, 1001 and 1000, the final reading being equivalent to the decimal value of 8.

The provision of the input means 137 and 136 also enables the counter register to be zeroed with less effort than would be required should all input pulses be applied to the input means $X_1$ and $X_2$.

As in the circuits of the embodiments of FIGS. 2 to 5 inclusive, when a simultaneous input is applied to the $X_1X_2$ or $X_3X_4$ input devices, there will be no change in the reading of the register as long as the inputs are simultaneously released. Also, in the same way, the proper change in the register reading can be accomplished by releasing the proper input device last in the sequence.

FIG. 6 discloses the use of relays 138 and 139 to effect the operation of the input devices $X_3$ and $X_4$. This is intended to represent one possible way in which the CARRY operation can be effected. Other means are possible for effecting the CARRY operation without deviating from the inventive concept. For example, additional contactors could be provided for the actuation of the input means $X_1$ and $X_2$ to energize the bistable devices $Y_3$ and $Y_4$ directly through the programming contactors under the control of the bi-stable devices $Y_1$ and $Y_2$. Such means would effect the same operations in the same manner and would therefore be within the scope of the invention.

As previously stated, while the invention is shown and described in its electrical form, using contactors, solenoids relays and the like to effect the operations, it is also possible to carry out the same operations in the same manner by using equivalent mechanical components.

The invention in its broadest aspects includes a single bi-stable device for each stage or digit or bit in the counter register; each bi-stable device being operable only during one phase of a two phase input thereto, as for example, either during the application of the energy thereto or during the discontinuance of the energy thereto. The bi-stable devices operate associated means to program the bi-stable devices for operations according to a predetermined code sequence. For each of the different codes, the invention includes the same basic elements and the apparatus differs only in the circuitry by which the components are connected. The invention still further includes separate input means for the add and subtract input operations, there being a single ADD and SUBTRACT input means for each pair of stages of the counter. The separate input means operate to produce either an ascending order or a descending order to the sequence of operations provided for by the programming means.

Resulting from the manner in which the components are arranged, a counting device is provided which contains a minimum of parts, is simple in circuitry and mode of operation and easy to maintain and service, resulting finally in a counter which operates with less time delay and less chance of error.

Having now disclosed my invention and the manner in which it can best be carried into operation, that which is considered to be my invention is set forth in the following claims.

I claim:

1. In a binary counter, a first and a second bi-stable device, each having a coil and an output contactor, said second bi-stable device having a control contactor, an add input means and a subtract input means each operating upon two contactors; circuit means for completing an energizing circuit for said first bi-stable device including two contactors of said add input means, one contactor of said subtract input means and said control contactor; and circuit means for completing an energizing circuit for said second bi-stable device including the other contactor of said subtract input means and one of said contactors of said add input means, both said circuit means being effective during the adding input to energize said second bi-stable device for each input pulse and to energize said first bi-stable device for every other input pulse.

2. In a binary counter, a first and second bi-stable device, each having a coil and an output contactor, said second bi-stable device having an additional control contactor; an add input means and a subtract input means, each having three contactors associated therewith; first and second circuit means for respectively completing an energizing circuit for said first and second bi-stable devices, each including a contactor of the add input means and a contactor of the subtract input means; and a third circuit means completing an energizing circuit for said first bi-stable device via said control contactor and selectively via the third contactor of the add input means and of the subtract input means.

3. A binary counter for both adding and subtracting comprising: a first and second bi-stable device, each having a single winding and a set of contactors, said second bi-stable device having a control contactor associated therewith and having first and second operating positions, said control contactor being operable between said first and second positions upon energization of said second bi-stable device; an add input means having first and second contactors adapted to operate simultaneously therewith; a subtract input means having third and fourth contactors adapted to operate simultaneously therewith, and circuit means interconnecting said windings, said control contactor and said first through fourth contactors to effect a change in the position of said contactors in response to inputs from said add and subtract input means, said circuit means being adaptable to de-energize and re-energize said second bi-stable device upon each application and release of pulses to said add input means and to energize said first bi-stable device during inputs to said add input means when said control contactor of said second bi-stable device is in said second position.

4. A binary counter for both adding and subtracting comprising: a first and second bi-stable device, each having a single winding and a set of output contactors, said second bi-stable device having a control contactor having first and second operating positions, said control contactor being operable between said first and second positions in response to energization of said second bi-stable device, an add input means having first and second contactors adapted to operate simultaneously therewith, a subtract input means having third and fourth contactors adapted to operate simultaneously therewith, and circuit means interconnecting said windings, said control contactor and said first through fourth contactors to effect a change in the position of said output contactors in response to inputs from said add and subtract input means, said circuit means being adaptable to re-energize said second bi-stable device upon each actuation and release of said subtract input means and to energize said first bi-stable device during inputs to said subtract input means only when said control contactor of said second bi-stable device is in said first position.

5. A binary counter for both adding and subtracting comprising: a first and a second bi-stable device, each having a single winding and a set of output contactors, said second bi-stable device having a control contactor mechanically interconnected with the pertaining set of output contactors, said control contactor having first and second operating positions, an add input means having first and second contactors interconnected therewith to operate simultaneously therewith, subtract input means having third and fourth contactors interconnected therewith to operate simultaneously therewith, and circuit means interconnecting said windings and contactors to effect a change in the position of said output contactors in response to inputs to said add and subtract input means, said circuit means being adaptable to re-energize said second bi-stable device upon each actuation and release of said add input means and to energize said first bi-stable device during inputs to said add input means only when said control contactor of said second bi-stable device is in said second position.

6. The counter as claimed in claim 5, in which said circuit means comprises: an energizing circuit for said first bi-stable device connected through said first contactor, said control contactor of said second bi-stable device, said third contactor and said second contactor, and an energizing circuit for said second bi-stable device connected through said second and fourth contactors.

7. A binary counter comprising: a first and a second bi-stable device, each having a single winding and a set of output contactors, said second bi-stable device having a control contactor interconnected with its pertaining output contactor, said control contactor having first and second positions, an add input means having first and second contactors interconnected therewith to operate simultaneously therewith, a subtract input means having third and fourth contactors interconnected therewith to operate simultaneously therewith, and circuit means interconnecting said windings and contactors to effect a change in the position of said output contactors in response to inputs to said add and subtract input means, said circuit means being adaptable to de-energize and re-energize said second bi-stable device upon each application and release of said subtract input means and to energize said first bi-stable device upon application of said subtract input means only when said control contactor of said second bi-stable device is in said first position.

8. A binary counter comprising: a first and a second bi-stable device, each having a single winding and a set of output contactors, said second bi-stable device having a control contactor interconnected with its pertaining output contactor, said control contactor having first and second positions, an add input means having first and second contactors interconnected therewith to operate simultaneously therewith, a subtract input means having third and fourth contactors interconnected therewith to operate simultaneously therewith, and circuit means interconnecting said windings and contactors to effect a change in the positions of said output contactors in response to inputs from said add and subtract input means, said circuit means being adaptable to de-energize and re-energize said second bi-stable device upon each actuation and release of said add input means and said subtract input means, and to energize said first bi-stable device during inputs to said add input means only when said control contactor of said second bi-stable device is in said second position and further to energize said first bi-stable device during inputs to said subtract input means only when said control contactor of said second bi-stable device is in said first position.

9. A binary counter for adding and subtracting comprising: a first and a second bi-stable device, each having a single winding and a set of output contactors, said second bi-stable device having a control contactor having first and second operating positions, said contactor being adaptable to change positions simultaneously with its pertaining output contactor, an add input means having first, second and third contactors adaptable to operate simultaneously therewith, a subtract input means having fourth, fifth and sixth contactors adaptable to operate simultaneously therewith, and circuit means interconnecting said windings, said control contactor and said first through sixth contactors to effect a change in the position of said output contactors in response to inputs to said add and subtract input means, said circuit means being adaptable to energize both said bi-stable devices when said output contactors are open and to de-energize and re-energize said second bi-stable device upon application and release of said add input means and to de-energize and re-energize said first bi-stable device during inputs to said add input means only when said control contactor of said second bi-stable device is in said second position.

10. A binary counter comprising; a first and a second bi-stable device, each having a single winding and a set of output contactors, said second bi-stable device having a control contactor interconnected with its pertaining set of output contactors, said control contactor having first and second positions, an add input means having first, second and third contactors interconnected therewith to operate simultaneously with said input means, a subtract input means having fourth, fifth and sixth contactors interconnected therewith to operate simultaneously with said subtract input means, and circuit means interconnecting said windings and contactors to effect a change in the position of said output contactors in response to inputs to said input means, said circuit means being adaptable to energize both said bi-stable devices when said output contactors are open and to de-energize and re-energize said second bi-stable device upon actuation and release of said add input means and also upon application and release of said subtract input means, said circuit means also being adaptable to de-energize and re-energize said first bi-stable device during adding only when said control contactor of said second bi-stable device is in said second position and further to de-energize and re-energize said first bi-stable device during subtracting only when said last mentioned control contactor is in said first position.

11. The counter as in claim 10 in which said circuit means comprises an energizing circuit for said first bi-stable device connected through said first and fourth contactors and two additional energizing circuits for said first bi-stable device connected through said control contactor of said second bi-stable device and said sixth contactor and alternately through said third contactor.

12. The counter as claimed in claim 9 in which a simultaneous application and release of both add and subtract input means produces no net change in the output means.

13. A binary counter for both adding and subtracting comprising: a first and a second bi-stable electrical device, each having output means for determining its alternate conditions, said second device having a control contactor having first and second conducting conditions, said control contactor being adapted to change conducting conditions simultaneously with its pertaining output means, add input means having first and second contactors adapted to operate simultaneously therewith, subtract input means having third and fourth contactors adapted to operate simultaneously therewith, and circuit means interconnecting said bi-stable electrical devices, said control contactor and said first through fourth contactors to effect a change in said output means in response to inputs to said add and subtract input means, said circuit means being adaptable to de-energize and re-energize said second bi-stable device upon each actuation and release of said add input means and to energize said first bi-stable device during adding only when said control contactor of said second bi-stable device is in said second conducting condition, said circuit means comprising: an energizing circuit for said first bi-stable device connected through said first contactor, said control contactor, said third contactor and said second contactor, and an energizing circuit for said second bi-stable device connected through said second and fourth contactors.

14. A binary counter for both adding and subtracting comprising: a first and a second bi-stable electrical device, each having output means for determining its alternate conditions, said second bistable device having a control contactor having first and second conducting conditions, said control contactor being adapted to change conducting conditions simultaneously with its pertaining output means, add input means having first, second and third contactors adaptable to operate simultaneously with said add input means, subtract input means having fourth, fifth and sixth contactors adaptable to operate simultaneously with said subtract means, and circuit means interconnecting said bi-stable devices, said control contactor and said first through sixth contactors to effect a change in said output means in response to inputs to said add and subtract input means, said circuit means being adaptable to energize both said bi-stable electrical devices when the output means are in open condition and to de-energize and re-energize said second bi-stable device upon application and release of said add input means and to de-energize and re-energize said first bi-stable device during adding only when said control contactor of said second bi-stable device is in said second conducting condition, and further said circuit means is adaptable to de-energize and re-energize said first bi-stable device during subtracting only when said control contactor is in said first conducting position.

15. A bi-directional binary counter for adding and subtracting comprising: a single bi-stable device for each digit in a binary code having an output means operable between two stable positions and a single actuator means operable upon energization to move said output means from one stable position to the other, control means operable by said bi-stable devices between two stable positions for controlling the sequence of energization of said bi-stable devices to obtain an operation of said output devices in accordance with a binary code, add and subtract input means for each pair of bi-stable devices to which input pulses are applied and having means for controlling the order of the sequence of the operation, the add input means providing for an ascending order to the sequence and the subtract means providing for a descending order to said sequence.

16. A bi-directional binary counter for adding and subtracting comprising: a single bi-stable device for each digit in a binary code having an output means operable between two stable positions and a single actuator operable upon one phase of a two phase input thereto to move said output means from one stable position to the other, control means operable by said bi-stable devices between two stable positions for controlling the sequence of the two phase inputs to said bi-stable devices to obtain an operation of said output devices in accordance with the binary code, add and subtract input means for each pair of bi-stable devices to which input pulses are applied and released, and having means for controlling the order of the sequence of the operation, the add input means providing for an ascending order to the sequence and the subtract means providing for a descending order to said sequence.

17. A bi-directional binary counter for adding and subtracting comprising: a single bi-stable device for each place in a binary code register, each bi-stable device including an output means movable between two stable positions and an actuator operable upon being energized to move said output means from one stable position to the other, an add and subtract input means for each pair of bi-stable devices having means operable therewith to control the energization and de-energization of said pair of bi-stable devices, control means operable between two stable positions by said bi-stable devices for controlling the sequence of energization of said pair of bi-stable devices whereby inputs to said add input means will produce an order of sequence of operation of said pair of bi-stable devices in the ascending direction and whereby inputs to said subtract input means will produce an order of sequence of operation of said pair of bi-stable devices in the descending direction according to said binary code.

18. A bi-directional binary counter for adding and subtracting comprising: a single bi-stable device for each place in a binary code, each having an output means operable between two stable positions indicative of two conditions of said binary code digit, and an actuating means operable only upon being energized to actuate said output means from one stable position to the other, control means operable between two stable positions by said bi-stable devices to control the sequence of energization of said bi-stable devices, add and subtract input means to which input pulses are to be applied and released for controlling the order of sequence of energization and de-energization of said bi-stable devices and means for connecting said add input means, said control means and said bi-stable devices to provide for one order of sequential energization of said bi-stable devices to effect a counting operation in said output means in an ascending direction and means for connecting said subtracting means, said control means and said bi-stable devices to provide for an opposite order of sequential energization of said bi-stable devices to effect a counting operation of said output means in the descending direction.

19. A bi-directional binary counter for adding and subtracting comprising: a single bi-stable device for each binary code digit, each having an output means operable between two stable positions and actuating means operable only upon energization thereof to actuate said output means from one stable position to the other stable position, control means connected to the bi-stable device for the least significant binary code digit, operable between a first and second stable position with said output means thereof, add and subtract input means to which input pulses are applied and released, each having connections with said bi-stable devices for controlling the energization and de-energization thereof, said connections including a direct connection between each said input means and the bi-stable devices of said least significant binary code digit, and a connection therefrom through said control means to the bi-stable device of said next more significant binary code digit, whereby said bi-stable device of said least significant binary code digit will be energized upon every input pulse to said add and subtract input means and whereby the bi-stable device of said next more significant binary code digit will be energized upon every other pulse to said input means.

20. A bi-directional binary counter for adding and subtracting comprising: a single bi-stable device for each binary code digit in the register thereof, having an output means in said register operable between two stable positions to indicate one or the other of two conditions of the digits and actuating means operable during the energization thereof to move said output means from one stable position to the other, control means associated with each bi-stable device operable thereby between two stable control positions for determining the sequence of the energization of said bi-stable devices, add and subtract input means to which input pulses are applied and released for controlling the order of sequence of energization of said bi-stable devices having means connected to said bi-stable devices through said control means whereby said output means will be actuated in a sequence according to the Gray binary code on an ascending order for inputs to said add input means and on a descending order for inputs to said subtract input means.

21. A bi-directional binary counter for adding and subtracting comprising: a binary bi-stable device for each binary code digit having an output means movable between two stable positions indicative of one or the other of two possible conditions for the binary digits and an actuating means operable upon energization to move said output means from one stable position to the other, control means associated with the least significant of the pairs of bi-stable devices for actuation thereby between two stable control positions for determining the sequence of energization of the bi-stable devices of each pair, add and subtract input means for each pair of bi-stable devices to which input pulses are applied for controlling the order of sequence of the energization of the bi-stable devices in each pair whereby an input pulse to said add input means will produce an ascending order in the sequence of energization of the bi-stable devices in each pair and an input pulse to the subtract input means will produce a descending order in the sequence of energization of the bi-stable devices of each pair, means connected to the add and subtract input means of the next more significant pair of bi-stable devices for applying an input pulse thereto and means actuated by the bi-stable devices of the next least significant pair of bi-stable devices to transfer an input pulse therefrom to the input means of the next more significant pair of the bi-stable devices.

22. A bi-directional binary counter for adding and subtracting in a binary code sequence comprising: a bi-stable device for each binary code digit having output contactors movable between an open stable position and a closed stable position indicative of one or the other of two possible conditions for the binary digits and a single winding operable upon energization to move said output contactor from one stable position to the other, a control contactor associated with the least significant of the bi-stable devices of the pairs of bi-stable devices for actuation thereby between two control positions for determining the sequence of energization of the windings of the bi-stable devices of the pairs of bi-stable devices, add and subtract input means for each pair of bi-stable devices to which input pulses are applied for controlling the order of sequence of the energization of the windings of the bi-stable devices in each pair, means actuated by said input means for controlling the order of sequence of the energization of the windings of the bi-stable devices in each pair whereby an input pulse to said add input means will produce an ascending order in the sequence of energization of the windings of said bi-stable devices in each pair and an input to the subtract input means will produce a descending order in the sequence of energization of the windings of said bi-stable devices in each pair, relay means connected to the add and subtract input means of the next more significant pair of bi-stable devices for applying input pulses thereto and contactor means actuated by the bi-stable devices of the next least significant pair of bi-stable devices for controlling the relay means to transfer input pulses from the bi-stable devices of the least significant pair of bi-stable devices to the input means of the bi-stable devices of the next more significant pair of bi-stable devices when said least significant pair of bi-stable devices return their output contactors to their open positions.

23. A bi-directional binary counter for adding and subtracting in a binary Gray code sequence comprising: a pair of bi-stable devices, each including an output contactor operable between an open stable position and a closed stable position, a single actuating winding operable upon energization to move their output contactors from one stable position to the other, control means associated with each said bi-stable device for actuation thereby between two stable control positions connected to the windings of said bi-stable devices for controlling the sequence of the energization of the windings in a manner to provide the Gray code sequence, add and subtract input means to which input pulses are applied and released, contactor means actuated with each said input means for establishing an energizing circuit to the windings of each said bi-stable devices and for breaking said circuits when pulses are applied to either of said input means and for maintaining said circuits completed when pulses are applied simultaneously to said input means, and other contactor means actuated by each said input means for establishing a second energizing circuit to the windings of each said bi-stable devices through said control contactors, whereby when an input pulse is applied to said add input means, the windings of said bi-stable devices will be energized according to an ascending order of the Gray code sequence and when an input pulse is applied to said subtract input means the windings of said bi-stable devices will be energized according to a descending order of the Gray code sequence.

24. A bi-directional binary code counter having a plurality of pairs of stages comprising: a single bi-stable device for each stage of each pair of stages, each bi-stable device having an output means representing one significant digit in a binary code register, movable between two stable positions representative of two possible conditions of a binary code digit, and actuating means responsive to one phase of a two phase input thereto to move said output means from one stable position to the other stable position, control means connected to the bi-stable device of the least significant digit of each pair of bi-stable devices for controlling the sequence of inputs of the two phase inputs to said pairs of bi-stable devices, an add and subtract input means for each pair of said bi-stable devices having means actuated thereby to produce a two phase input for said bi-stable devices, said add input means producing an ascending order in the sequence of operations of the bi-stable devices of the pair and said subtract input means producing a descending order to the sequence of operations of the bi-stable devices of each pair, a second means under the control of each least significant pair of bi-stable devices for providing for a carry-over of an input to the bi-stable devices of the next more significant pair of bi-stable devices when the least significant pair of bi-stable devices have completed their cycle of operations, and means connected to each input means of the least significant pair of bi-stable devices and operated thereby for providing a two phase input for the bi-stable devices of the next significant pair of bi-stable devices to effect a carry-over operation thereto, when said second control means are actuated to pass said two phase input.

References Cited by the Examiner

UNITED STATES PATENTS

| | | | |
|---|---|---|---|
| 2,561,073 | 6/51 | Schouten et al. | 317—140 |
| 2,767,910 | 10/56 | Vande Sande. | |
| 2,814,003 | 11/57 | Alizon | 317—140 |
| 2,883,588 | 4/59 | Leonard | 317—140 |
| 2,954,511 | 9/60 | Jaekel | 317—140 |
| 3,028,084 | 4/62 | Weatherill | 317—140 |
| 3,076,918 | 2/63 | Hinkle et al. | 317—140 |

SAMUEL BERNSTEIN, *Primary Examiner.*